United States Patent
McCallum et al.

(10) Patent No.: US 11,329,812 B2
(45) Date of Patent: May 10, 2022

(54) CONSTRAINED KEY DERIVATION IN MISCELLANEOUS DIMENSIONS

(71) Applicant: Red Hat, Inc., Raleigh, NC (US)

(72) Inventors: Nathaniel P. McCallum, Cary, NC (US); Peter M. Jones, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 269 days.

(21) Appl. No.: 16/269,926

(22) Filed: Feb. 7, 2019

(65) Prior Publication Data
US 2020/0259642 A1    Aug. 13, 2020

(51) Int. Cl.
*H04L 9/08*    (2006.01)

(52) U.S. Cl.
CPC ............ *H04L 9/0866* (2013.01); *H04L 9/088* (2013.01); *H04L 9/0894* (2013.01); *H04L 9/0869* (2013.01)

(58) Field of Classification Search
CPC .............. G06F 21/602; G06F 21/6218; G06F 21/6209; G06F 21/6245; H04L 9/0866; H04L 9/0861; H04L 9/0869; H04L 9/0872; H04L 9/08
See application file for complete search history.

(56) References Cited

U.S. PATENT DOCUMENTS

| | | | |
|---|---|---|---|
| 5,640,452 A * | 6/1997 | Murphy | H04N 7/165 342/357.31 |
| 6,978,376 B2 | 12/2005 | Giroux et al. | |
| 7,092,943 B2 | 8/2006 | Roese et al. | |
| 7,266,684 B2 | 9/2007 | Jancula | |
| 7,508,788 B2 | 3/2009 | Anjum | |
| 8,320,562 B2 | 11/2012 | Hammond et al. | |
| 9,026,787 B2 * | 5/2015 | Kufluk | H04W 12/06 713/155 |
| 9,053,329 B2 | 6/2015 | Lam | |
| 9,215,236 B2 | 12/2015 | Kennedy | |
| 9,729,318 B2 | 8/2017 | Hoy et al. | |
| 9,805,214 B2 | 10/2017 | Sahu et al. | |
| 9,818,315 B2 * | 11/2017 | Hiltunen | H04W 12/04 |
| 9,819,488 B2 * | 11/2017 | Gungor | H04L 9/0872 |
| 9,923,719 B2 * | 3/2018 | Kumar | H04L 9/3263 |
| 9,940,477 B2 * | 4/2018 | Sibillo | H04L 63/0435 |

(Continued)

OTHER PUBLICATIONS

Atallah, Mikhail J., et al, "Incorporating Temporal Capabilities in Existing Key Management Schemes", 2007, https://pdfs.semanticscholar.org/5c03/1ee99d0e1f2c8cd6799912da377ed591cb36.pdf, 16 pages.

(Continued)

*Primary Examiner* — Tae K Kim
(74) *Attorney, Agent, or Firm* — Lowenstein Sandler LLP

(57) ABSTRACT

The technology disclosed herein may enable a client to access a protected resource using cryptographic keys that are based on contextual data of a device. An example method may include: determining contextual data of a computing device; transforming the contextual data in view of conversion data associated with the computing device, wherein the conversion data causes a set of alternate contextual data values to transform to a specific cryptographic value; creating, by a processing device, a cryptographic key in view of the transformed contextual data; and using the cryptographic key to enable access to a protected resource.

17 Claims, 7 Drawing Sheets

(56) References Cited

U.S. PATENT DOCUMENTS

| | | | |
|---|---|---|---|
| 9,967,097 B2* | 5/2018 | Sivaramamurthy | ........................ H04W 12/033 |
| 10,152,604 B1* | 12/2018 | Diaz | ................... G06F 21/6209 |
| 10,778,413 B2* | 9/2020 | Chalker | ................ H04L 9/0816 |
| 11,184,350 B2* | 11/2021 | Mainali | ................ H04L 63/083 |
| 11,190,352 B2* | 11/2021 | Thaler, III | ............ H04L 9/3234 |
| 2002/0051540 A1* | 5/2002 | Glick | ................. H04L 63/1408 380/258 |
| 2002/0136407 A1 | 9/2002 | Denning et al. | |
| 2005/0071657 A1 | 3/2005 | Ryan | |
| 2007/0086593 A1* | 4/2007 | Denning | ............... H04L 9/0872 380/286 |
| 2007/0101438 A1* | 5/2007 | Govindarajan | ..... H04L 63/0428 726/27 |
| 2009/0052663 A1 | 2/2009 | Hammond et al. | |
| 2009/0316900 A1* | 12/2009 | Qiu | ....................... H04L 9/3242 380/258 |
| 2009/0319769 A1* | 12/2009 | Betouin | .................... H04L 9/12 713/150 |
| 2010/0257351 A1 | 10/2010 | O'Connor et al. | |
| 2012/0243687 A1 | 9/2012 | Li et al. | |
| 2013/0290696 A1* | 10/2013 | Broustis | .................... H04L 9/08 713/150 |
| 2014/0022920 A1 | 1/2014 | Dua et al. | |
| 2014/0164761 A1 | 6/2014 | Kufluk et al. | |
| 2015/0271155 A1 | 9/2015 | Ronca | |
| 2015/0349954 A1 | 12/2015 | Borda | |
| 2016/0013941 A1* | 1/2016 | Gungor | ................. H04L 9/0872 380/44 |
| 2016/0043866 A1 | 2/2016 | Nixon et al. | |
| 2016/0171238 A1* | 6/2016 | Sibillo | .................. H04W 4/029 713/164 |
| 2016/0197729 A1* | 7/2016 | Jones | .................... H04L 9/3215 713/184 |
| 2017/0070484 A1 | 3/2017 | Kruse et al. | |
| 2017/0070485 A1* | 3/2017 | Kumar | .................. H04L 9/0872 |
| 2017/0126698 A1* | 5/2017 | Minkovich | ........... H04L 9/3297 |
| 2017/0132533 A1* | 5/2017 | Darnell | ................... H04L 12/40 |
| 2017/0134369 A1 | 5/2017 | Bilal et al. | |
| 2017/0237556 A9* | 8/2017 | Denning | ............... H04L 9/0825 713/168 |
| 2017/0264608 A1 | 9/2017 | Moore et al. | |
| 2017/0372085 A1* | 12/2017 | Howe | ..................... G06F 21/62 |
| 2018/0069846 A1* | 3/2018 | Park | ...................... H04L 9/0866 |
| 2018/0219840 A1* | 8/2018 | Quaglia | ................ H04L 63/045 |
| 2019/0130136 A1 | 5/2019 | Claypool et al. | |
| 2019/0164156 A1 | 5/2019 | Lindemann | |
| 2020/0169400 A1* | 5/2020 | Thaler, III | ............. G06F 21/62 |
| 2020/0235911 A1 | 7/2020 | Safak et al. | |

OTHER PUBLICATIONS

Cui, Yihui et al, "A Time-Based Group Key Management Algorithm Based on Proxy Re-encryption for Cloud Storage", 2014, Wuhan University, China, https://link.springer.com/chapter/10.1007/978-3-319-11116-2_11, 4 pages.

Badawya, Ahmed et al, "Unleashing the Secure Potential of the Wireless Physical Layer: Secret Key Generation Methods", Jun. 2016, Politecnico di Torino, DET, Italy, 10 pages.

Beretino, Elisa et al., "Location-Based Access Control Systems for Mobile Users—Concepts and Research Directions", Nov. 2011, Purdue University, 5 pages.

Gholap, Nisha et al., "Location and Authentication Based Encryption Scheme Application Design For Mobile Device", Apr. 2013, vol. 2 Issue 4, International Journal of Engineering Research & Technology, 5 pages.

Liao, Hsien-Chou et al., "A New Data Encryption Algorithm Based on the Location of Mobile Users", Information Technology Journal, 7: 63-69, 15 pages.

Naidu, P. Sanyasi, "Investigation and Analysis of Location based Authentication and Security Services of Wireless LAN's and Mobile Devices", Jul. 2016, vol. 146, No. 8, International Journal of Computer Applications, 6 pages.

* cited by examiner

CONSTRAINED KEY DERIVATION IN MISCELLANEOUS DIMENSIONS

TECHNICAL FIELD

The present disclosure is generally related to cryptographic systems, and is more specifically related to a cryptographic access control mechanism that uses cryptographic keys that are based on contextual data of a device at a time before, during, or after attempting to access a protected resource.

BACKGROUND

Modern computers often use cryptographic techniques to restrict access to content. The cryptographic techniques may involve generating a secret key that is used by a device to access the content. The secret key may be something as simple as a passcode or something more complex, such as a cryptographic token. The device may use the secret key as input to a locking mechanism to gain access to the content. The locking mechanism may involve a cryptographic function and the device may use the secret key as input when executing the cryptographic function. If the secret key is correct, the cryptographic function will enable access to the content and if the secret key is incorrect, the cryptographic function will not enable access to the content. In a simple example, the secret key may be used with the cryptographic function to encrypt the content and may be subsequently used to decrypt the content in order to enable a device to access the content.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
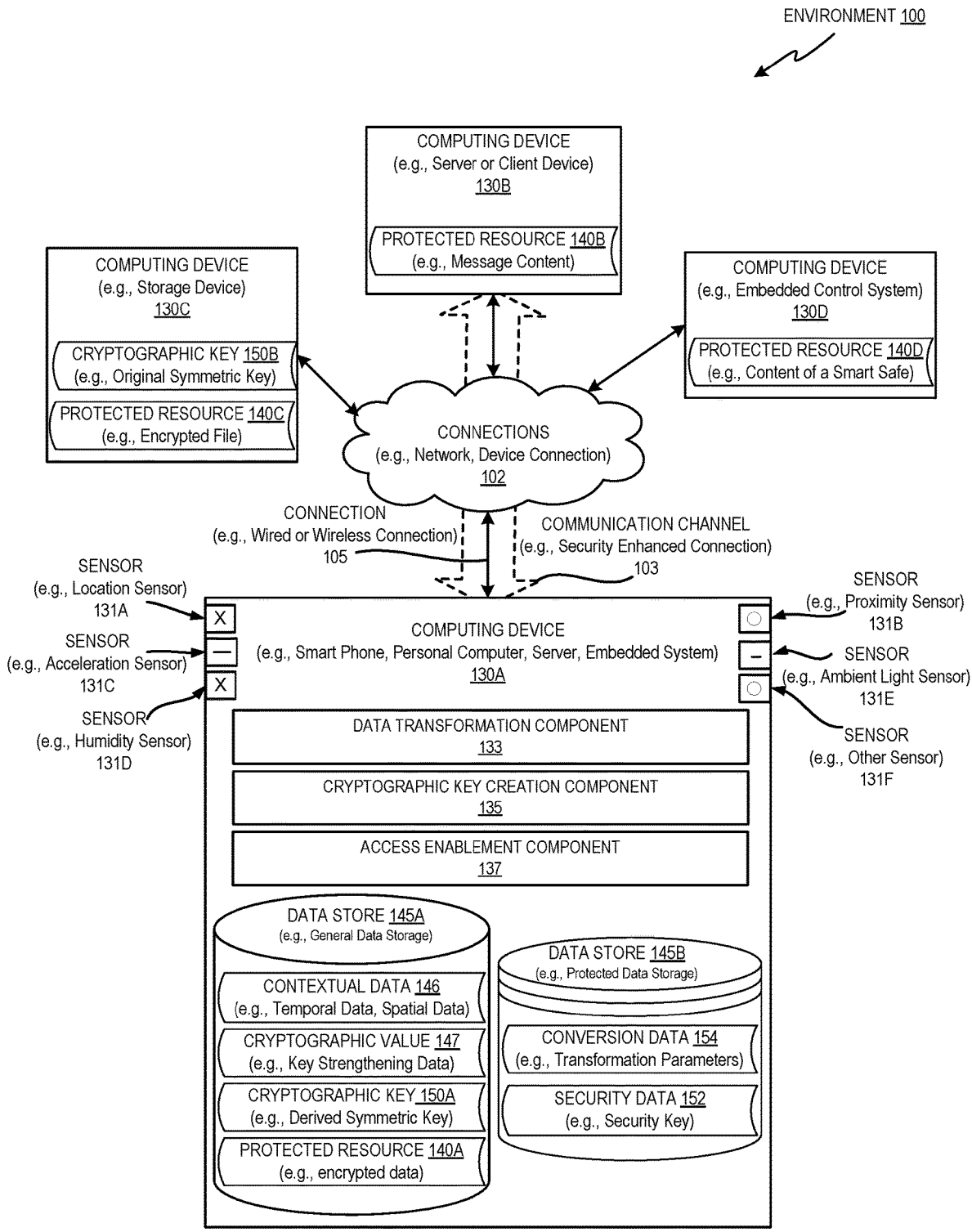
FIG. 1 depicts a high-level block diagram of an example environment, in accordance with one or more aspects of the present disclosure.

Modern computer systems restrict access to content using cryptographic techniques and enable access to the content by providing devices with a key. The access is traditionally provided at a binary level and the device has access to the content if the device has the key and is prohibited access if the device does not have the key. The binary level of traditional cryptographic techniques is equivalent to a uni-dimensional access mechanism that is based on whether the device attempting to access the content is in possession of the key. Restricting access based on possession alone is often insufficient for a more sophisticated access control mechanism.

Systems have attempted to enhance the criteria used to access content by providing an access control layer on top of the cryptographic techniques. The access control layer may include executable rules that check additional criteria and control whether the device is or is not able to use the cryptographic key. The executable rules can be circumvented or compromised and rarely provide the same level of security that the underlying cryptographic techniques provide. For example, the rules may execute on the same device that is attempting to access the content and the device may be compromised in a manner that enables the device to bypass the access control layer to access the cryptographic key directly and therefore enables the device to access the content.

Aspects of the present disclosure address the above and other deficiencies by providing enhanced cryptographic access control technology. The technology may control access to a protected resource based on time, location, key possession, other criteria, or a combination thereof. The access control criteria may be integrated within the cryptographic technique (e.g., cryptographic key derived from measurement data) as opposed to executable rules layered above the cryptographic technique. In one example, the cryptographic access control technology disclosed herein may involve determining contextual data of a computing device. The contextual data may be derived from measurement data of a property detected by one or more sensors of the computing device attempting to access protected resources. The one or more sensors may be used to measure the properties of the computing device or the surrounding environment and may include measurement of temperature, humidity, location, lighting, other property or a combination thereof. The computing device may transform some or all of the contextual data into one or more cryptographic values based on conversion data associated with the computing device. The conversion data may be provided by a trusted source and may be formed in view of access criteria that determine the situations in which the computing device should have access to the protected resource. For example, the access criteria may indicate the protected resource can be accessed when the computing device is within a specific geographic location and the conversion data may include input for a mathematical function that is used to transform a location coordinates into one or more cryptographic values. The computing device may use the transformed location data to create a cryptographic key and the cryptographic key may be used to access a protected resource. If the location data was incorrect (e.g., computing device not within the geographic location), then the resulting cryptographic key may still be generated but may fail to provide access to the protected resource. Access to the protected resource may involve decrypting a protected resource (e.g., decrypting a local file), establishing a communication channel (e.g., establishing a security enhanced connection), opening a locking mechanism (e.g., unlocking a safe), satisfying an access control mechanism, or a combination thereof.

The systems and methods described herein include technology that provides an enhanced cryptographic access control mechanism. In particular, aspects of the present disclosure may expand the access criteria that can be used to restrict or provide access to content. The cryptographic access control mechanism may control access based on a variety of factors, such as time, location, or other contextual data. The contextual data may be detected before, during, or after the device attempts to access the protected resource. The expanded access criteria may enable the technology to provide more precise access controls for defining situations in which the device is and is not restricted from accessing the protected resource. In addition, aspects of the present disclosure may enhance the security of the cryptographic access control mechanism by embedding the expanded access criteria into the cryptographic technique. By incorporating the expanded access criteria into key creation, the ability of compromised or malicious executable code to circumvent the access control mechanism is reduced.

Various aspects of the above referenced methods and systems are described in details herein below by way of examples, rather than by way of limitation. The examples provided below discuss an environment where a computing device is provided access to a protected resource based on the context of the computing device before, during, or after attempting to access the protected resource.

FIG. 1 illustrates an exemplary environment 100 in which implementations of the disclosure may operate. Environment 100 may include one or more computing devices at a single physical location or across multiple physical locations. In one example, environment 100 may include one or more protected resources 140A-D, one or more cryptographic keys 150A-B, and one or more computing devices 130A-D.

Protected resources 140A-D may be any intangible or tangible resource that a computing device or user can be restricted from accessing. An intangible resource may be a resource that cannot be touched and may include data of messages (e.g., packets, data frames, analog or digital signals), data storage objects (e.g., computer files, database records, arrays), other digital or analog resources, or a combination thereof. Tangible resources may include resources that can be touched and may include computer hardware, physical credentials (e.g., ID badges, licenses), paper documents, currency, other physical objects, or a combination thereof.

Cryptographic keys 150A-B may be any piece of information that can be used to enable a computing device or user to access one or more of the protected resources 140A-D. Cryptographic keys 150A-B may exist in a human readable form (e.g., passcode, password), a non-human readable form (e.g., digital token or digital certificate), other form, or a combination thereof. Cryptographic keys 150A-B may be used as input to a cryptographic function or may be the output of a cryptographic function. Cryptographic keys 150A-B may be the same or similar to encryption keys, decryption keys, session keys, transport keys, authentication key, authorization key, digital certificates, signature keys, integrity keys, verification keys, digital tokens, tags, license keys, hashes, other data or data structure, or a combination thereof.

One or more of the cryptographic keys 150A-B may be used in a cryptographic system that provides privacy, integrity, authentication, authorization, non-repudiation, other features, or a combination thereof. The cryptographic system may be the same or similar to a symmetric key cryptographic system, an asymmetric key cryptographic system, or a combination thereof. A symmetric key cryptographic system may use the same cryptographic keys for encryption of plaintext and for decryption of ciphertext. The cryptographic keys may be referred to as symmetric keys and may be identical keys (e.g., copies of the same key) or there may be a simple transformation to go between two keys (e.g., between keys of a key pair). The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 1024). The symmetric key cryptographic system may be the same or similar to Advanced Encryption Standard (AES), Galois/Counter Mode (GCM), Data Encryption Standard (DES), Triple Data Encryption Standard (3DES, TDES), International Data Encryption Algorithm (IDEA), Blowfish, other cryptographic system, or a combination thereof.

An asymmetric key cryptographic system may use different keys for encryption and decryption. A first key may be used to encrypt plaintext into ciphertext and a second key may be use to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public key and the second key may be a private key. The public key may be published and accessible to multiple computing devices and the private key may remain secret and only accessible to one or more computing device associated with a particular entity (e.g., user). A public key cryptographic system may enable any device to encrypt data using the public key of a recipient device. The encrypted data may be decrypted with the recipient's private key. An advantage of asymmetric key cryptographic system is that it may avoid the need of a secure channel for an initial exchange of one or more cryptographic keys between the parties, which is often a challenge for symmetric cryptographic systems.

In one example, environment 100 may use a combination of an asymmetric cryptographic system and a symmetric cryptographic system. For example, one or more of the computing devices 130A-D may use an asymmetric cryptographic system to perform an exchange of security data 152 (e.g., security key), conversion data 154 (e.g., transformation parameters), or a combination there of. The exchanged data may then be used to create a cryptographic key (e.g., 150B) that enables one of the computing devices 130A-D to access or provide access to one of the protected resources 140A-D.

Computing devices 130A-D may include one or more mobile devices (e.g., smart phones, tablets, watches, key fobs, smart card), personal computers (e.g., desktop, workstation, laptop), server devices (e.g., standalone servers or rack mounted servers), embedded systems (e.g., safes, door locks, automation devices), other electrical or electromechanical device, or a combination thereof. Computing devices 130A-D may be able to create, transmit, receive, or use one of the cryptographic keys 150A-B to protect or access resources. Each of the computing devices 130A-D may function as a requesting device, as a protecting device, or a combination thereof. A requesting device may request access to a protected resource and the protecting device may provide restricted access to the protected resource.

Computing device 130A may be an example of a requesting device and may be used to access one or more of the protected resources 140A-D. Computing device 130A may be referred to as a "user device," "client device," "access requesting device," or other term. Computing device 130A may attempt to access a remote resource that is present on another computing device (e.g., protected resource 140C on computing device 130C) or a local resource that is stored in data storage 145A of computing device 130A (e.g., protected resource 140A). Computing device 130A may include one or more sensors 131A-C to detect contextual data 146 of the computing device.

Sensors 131A-F may include one or more location sensors 131A (e.g., Global Positioning Sensors (GPS)), proximity sensors 131B (e.g., WiFi, or Bluetooth Sensors), acceleration sensor 131C (e.g. accelerometer), humidity sensor 131D (e.g. hygrometer), ambient light sensor 131E, other sensors 131F (e.g., thermometer, barometer, altimeter, scale, compass, speedometer), or a combination thereof.

A location sensor 131A may enable computing device 130A to detect the physical or virtual location of itself or of one or more of the requesting or providing devices (e.g., 130B-C, FIG. 1), a communication device (e.g., beacon, access point, communication tower), other device, or a combination thereof. The location sensor may correspond to satellites, cellular towers, Global Positioning System (GPS), or a combination thereof. Location data determined by the location sensor may correspond to a location within a reference system (e.g., coordinate system, geo-fence) that is the same or similar to a spherical system (e.g., geographic coordinate system), Euclidean system, or other reference system. In one example, location data may include a coordinate with two values that identify a point in two-dimensional space, such as a latitude and longitude pair. In another example, location data may include more or less values and may identify a point in three-dimensional space, such as a latitude and longitude pair coupled with a height value (e.g., altitude, elevation, depth, geopotential height).

A proximity sensor 131B may enable computing device 130A to detect whether it is in the presence of a nearby object without requiring physical contact with the object. The proximity sensor may include one or more communication modules (e.g., Bluetooth® transceiver) that can be used to detect signals from one or more devices or other pieces of hardware that transmit the signals. The signal may be a wireless signal, a wired signal, or a combination thereof. The signal source may include beacons (e.g., bluetooth beacons), network nodes (e.g., Wi-Fi® access points, switches, routers), other devices, or a combination thereof. Proximity data determined by the proximity sensor may indicate a physical location that is relative to another device (e.g., a relative location) without knowing an absolute location (e.g., geographical location). In one example, proximity data may indicate a distance value (e.g., linear distance) between computing device 130A and one or more objects. In another example, proximity data may indicate whether computing device 130A is within a linear distance threshold with or without providing a particular distance value.

Acceleration sensor 131C may include an accelerometer. Accelerometer may enable computing device 130A to measure the acceleration felt by people and objects. Acceleration is the rate of change of the velocity of an object. For example, accelerometers may be used to measure vehicle acceleration, measure vibration on cars, machines, buildings, and safety installations. Accelerometers may also be used to measure seismic activity, machine vibration, inclination, and speed with or without the influence of gravity. In one example, accelerometer data may indicate whether computing device 130A is located inside a moving vehicle or located in a standstill location.

Humidity sensor 131D may include a hygrometer. A hygrometer may enable computing device 130A to measure the amount of humidity and water vapor in the atmosphere, in soil, or in confined spaces. Hygrometer may rely on measurements of some other property such as temperature, pressure, mass, or a mechanical or electrical change in a substance as moisture is absorbed. These measured properties may lead to a measurement of humidity after applying calculation and calibration methods to the measured data. In one example, hygrometer data may indicate whether the humidity in the environment surrounding computing device 130A is below or above a preconfigured threshold of humidity value. For example, the computing device 130A may be a lock box that may be accessible when the humidity value around the lock box is below the preconfigured threshold.

Ambient light sensor 131E may enable computing device 130A to determine the ambient light level in the environment surrounding computing device 130A. Because ambient light sensors can be partly or fully obscured by shadows or objects that cover the sensor, multiple sensors placed some distance apart may be used to provide a better approximation of the current lighting conditions. An ambient light sensor may be a phototransistor, a photodiode, or a photonic integrated circuit. A phototransistor is a light-sensitive bipolar transistor encased in a transparent case so that light can reach a base-collector junction. A photodiode is a semiconductor device that converts light into an electrical current. A photonic integrated circuit integrates a photodetector and an amplifier in one device. In one example, ambient light data may indicate whether the intensity of light in the environment surrounding computing device 130A is below or above a preconfigured threshold of light intensity value. For example, a protected resource associated with computing device 130A may be accessible when the computing device 130A is outdoors during daylight.

Other sensors 131F may include thermometer, barometer, altimeter, scale, compass, speedometer, or a combination thereof. A thermometer may enable computing device 130A to determine the temperature in the environment surrounding computing device 130A. In one example, thermometer data may indicate whether the temperature of the environment surrounding computing device 130A is below or above a preconfigured threshold of temperature value. For example, a protected resource associated with computing device 130A may be accessible when the computing device 130A is located below certain temperature. A barometer may enable computing device 130A to determine the atmospheric pressure in the environment surrounding computing device 130A. In one example, barometer data may indicate whether the pressure of the environment surrounding computing device 130A is below or above a preconfigured threshold of pressure value. For example, a protected resource associated with computing device 130A may be accessible when the computing device 130A is located at a certain atmospheric pressure value. An altimeter may enable computing device 130A to determine the altitude where computing device 130A is located. In one example, altitude data may indicate whether the altitude where computing device 130A is located is within a range of minimum and maximum altitude. For example, a protected resource associated with computing device 130A may be accessible when the computing device 130A is within a certain range of altitude values.

A scale may enable computing device 130A to determine the weight of computing device 130A or the weight of another object as measured by computing device 130A. In one example, weight data may indicate whether the weight measured by computing device 130A is below or above a preconfigured threshold of weight value. For example, a protected resource associated with computing device 130A may be accessible when the computing device 130A measures a weight at or below a certain weight value. A compass may enable computing device 130A to determine the direction of a vehicle carrying computing device 130A. In one example, compass data may indicate whether computing device 130A is located inside a vehicle moving towards a specific direction. A speedometer may enable computing device 130A to measure the velocity of a vehicle carrying computing device 130A. In one example, speedometer data may indicate whether computing device 130A is located inside a vehicle moving above or below a certain speed limit.

As shown in FIG. 1, computing device 130A may include a data transformation component 133, a cryptographic key creation component 135, and an access enablement component 137. Data transformation component 133 may enable computing device 130A to determine contextual data 146 (e.g., temporal data, location data, proximity data) derived from computing device 130A, environment 100, or a combination thereof. Data transformation component 133 may transform the contextual data 146 into one or more cryptographic values 147 in view of conversion data 154, other data, or a combination thereof. Cryptographic key creation component 135 may use the one or more cryptographic values 147, secret data 152, other data, or a combination thereof to create a cryptographic key 150A. Access enablement component 137 may use cryptographic key 150A to enable access to one of the protected resources 140A-D. Components 133, 135, and 137 are discussed in more detail below in regards to FIG. 2 and may be used to access protected resources provided by computing devices 130B-D (e.g., "access providing devices").

Computing device 130B may be a client device or server device with access to protected resource 140B. Computing device 130B may provide computing device 130A with access to protected resource 140B via a communication channel 103. Communication channel 103 may involve one or more connections 105 that communicably couple computing device 130A with one or more other devices (e.g., computing device 130B). Connection 105 may include one or more wired connections, wireless connections, or a combination thereof. Communication channel 103 may be associated with cryptographic key 150A and may use cryptographic key 150A to enhance one or more security features. The security features may enhance privacy, integrity, authentication, authorization, non-repudiation, other feature, or a combination thereof. In one example, communication channel 103 may be a security enhanced connection that occurs at any level of the networking stack and may be the same or similar to a connection based a Secure Socket Layer (SSL) connection, Transport Layer Security (TLS), Internet Protocol Security (IPSec), Virtual Private Network (VPN), Hyper Text Transfer Protocol Secure (HTTPS), other connection technology or protocol, or a combination thereof.

Communication channel 103 may be initiated or established by computing device 130A, computing device 130B, or a combination thereof. Cryptographic key 150A may be used to establish communication channel 103 or to enhance an existing communication channel. In one example, cryptographic keys 150A may be session key that is used to encrypt and/or decrypt protected resource 140B. Protected resource 140B may include data that is stored in an encrypted or non-encrypted form when on computing device 130B and may be transmitted over communication channel 103 in an encrypted (e.g., or doubly encrypted) form. Computing device 130A may then receive the encrypted data and decrypt it using cryptographic key 150A.

Communication channel 103 may be a network connection, a peer-to-peer connection, other connection, or a combination thereof. The network connection may be an indirect connection that traverses one or more network nodes (e.g., access points, switches, routers, or other networking infrastructure device) that separate computing device 130A with one or more of the computing devices 130B-D. A peer-to-peer connection may be a direct connection between computing device 130A and one of the computing devices 130B-D.

Computing device 130C may include or be coupled to a data storage device that stores protected resource 140C. Protected resource 140C may include one or more encrypted data storage objects, which may include file objects (e.g., encrypted files), database objects (e.g., databases, records, field values), other storage objects, or a combination thereof. Computing device 130C may provide computing device 130A with access to protected resource 140C by transmitting data of protected resource 140C (e.g., encrypted content) over an encrypted or non-encrypted communication channel. Computing device 130A may receive the data and decrypt the data using cryptographic key 150A.

Cryptographic key 150A of the requesting device (e.g., 130A) and cryptographic key 150B of the providing device (e.g., 130C) may be identical but may have been independently created (e.g., derived separately). For example, computing device 130C may create a first cryptographic key (i.e., 150B) and may encrypt the protected resource 140C using the first cryptographic key. Computing device 130A may create a second cryptographic key and use the second cryptographic key to decrypt the protected resource 140C. The first and second cryptographic keys may be identical but may be created on different computing devices and may not have been exchanged between the different computing devices (e.g., not the results of a key exchange). The first and second cryptographic key may have been created at the same time or at different times. In one example, the first cryptographic key may be created and used to encrypt the protected resource at a first time (T1) and the second cryptographic key may be created and used to decrypt the protected resource at a second time (T2). The first time may be seconds, days, weeks, months, or years earlier than the second time (e.g., $T1 \ll T2$).

In the example shown if FIG. 1, computing device 130C may include the cryptographic key used to encrypt protected resource 140C (e.g., cryptographic key 150B). In another example (not shown), computing device 130C may be absent the cryptographic key used to encrypt protected resource 140B. In either example, computing device 130C may or may not have performed the encryption of protected resource 140C. For example, the encryption may have been performed by another device (e.g., server computing device 130B) and the other device may have stored the protected resource 140C on computing device 130C with or without storing the cryptographic key used to encrypt the protected resource 140C.

Computing device 130D may be an embedded control system that provides or restricts access to protected resource 140D. In one example, computing device 130D may be an embedded control system that provides physical access to an access restricted region (e.g., lockable region). The access may restrict the ability to enter, leave, add, or remove something or someone from the restricted region. The restricted region may be partially or fully enclosed and may include one or more points of access that may be restricted (e.g., restricted entry points). Example restricted regions may include computer enclosures (e.g., computer cases, rack units, server cabinets), boxes (e.g., safes, lock boxes), rooms (e.g., server rooms), buildings (e.g., data centers), other regions, or a combination thereof. Protected resource 140D may be any tangible resource associated with computing device 130D and may include computer hardware (e.g., adapter, port, connection point), physical credentials (e.g., ID badge, passport, license), paper documents, currency, other physical objects, or a combination thereof.

In one example, computing device 130D may be a lock box and protected resource 140D may be a tangible object in the lock box. The lock box may be accessible during particular dates and times (e.g., work days). A user may use computing device 130A (e.g., a mobile phone) to access the lock box based on contextual data associated with the phone at the time access is requested. The contextual data may correspond to the system time of computing device 130A when access is requested. Computing device 130A may use the contextual data to derive cryptographic key 150A and use the cryptographic key 150A to request access to the lock box. The embedded control system of the lock box may receive and verify cryptographic key 150A using a cryptographic function. In response to the verification being satisfied, the computing device 130B may unlock the restricted access point (e.g., lock box door) and a user of computing device 130A may retrieve the physical object.

Figure 2:
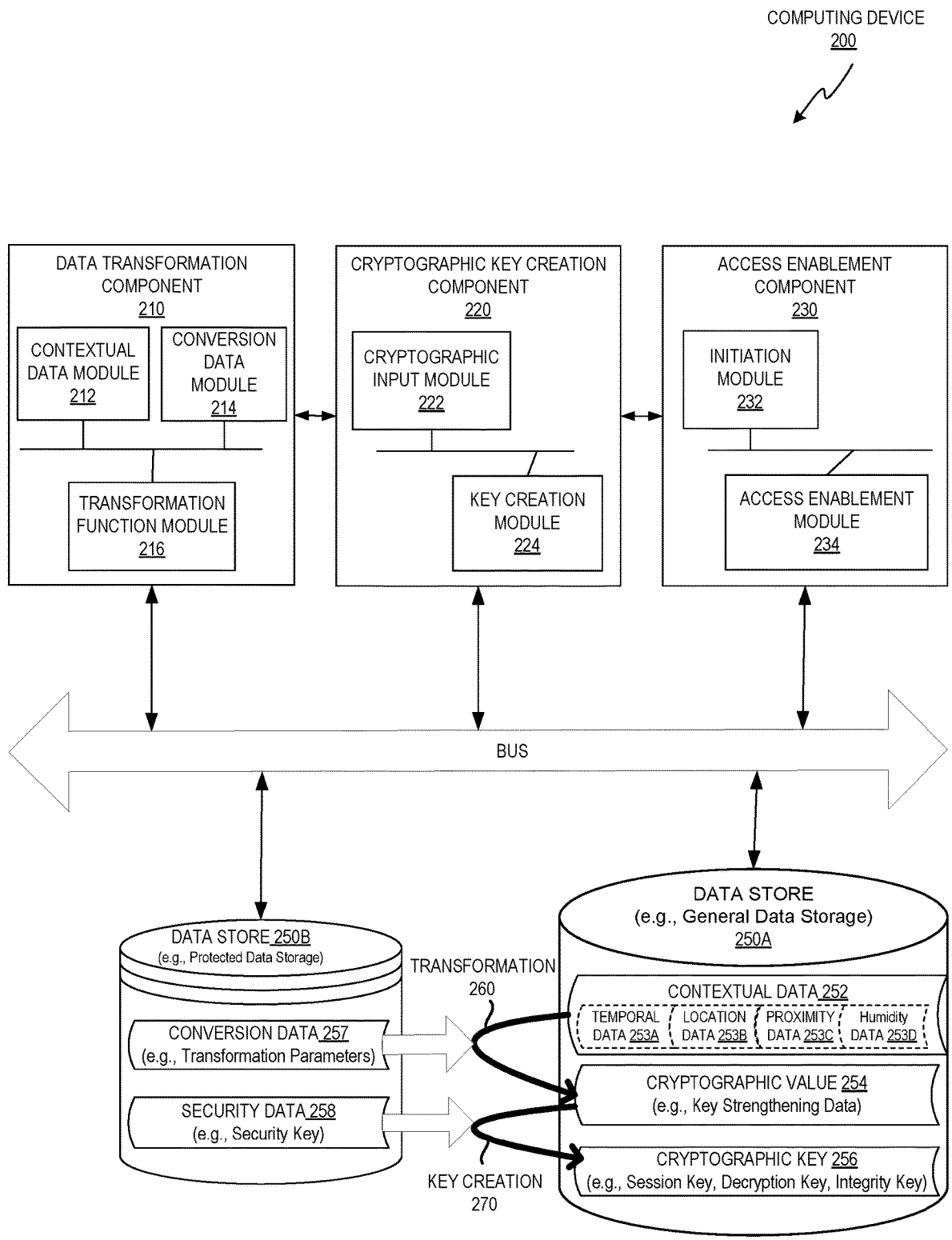
FIG. 2 depicts a block diagram of an example computing device with one or more components and modules, in accordance with one or more aspects of the present disclosure.

FIG. 2 is a block diagram illustrating example components and modules of computing device 200 in accordance with one or more aspects of the present disclosure. Computing device 200 may be the same or similar to one or more of computing devices 130A-D of FIG. 1. The components, modules, or features discussed in regards to computing device 200 may consolidated to a single computing device or may be spread across multiple computing devices. In the example shown, computing device 200 may include a data transformation component 210, a cryptographic key creation component 220, an access enablement component 230, and one or more data stores 250A-B.

Data transformation component 210 may enable computing device 200 to identify contextual data (e.g., temporal data, proximity data, location data) and to transform the contextual data into a form that can be used to create a cryptographic key. In one example, data transformation component 210 may include a contextual data module 212, a conversion data module 214, and a transformation function module 216.

Contextual data module 212 may include features for determining a context of computing device 200 before, during, or after computing device 200 requests access to the protected resource. The context of computing device 200 may relate to one or more characteristics of the requesting device (e.g., computing device 130A, FIG. 1), of the providing device (e.g., computing device 130B-D, FIG. 1), of the environment, or a combination thereof. The characteristics (e.g., properties) of a device may relate to a location of the device, time of an access request, distance to another device, acceleration of vehicle carrying the device, direction of vehicle carrying the device, speed of vehicle carrying the device, altitude of the location of the device, weight of the device or weight measured by the device, other characteristic, or a combination thereof. The characteristics of the device may be determined based on system settings, configurations, or operating details, and may include a time of the computing device (e.g., system time, network time). Characteristics of the environment may be characteristics that are external to computing device and may include physical properties, attributes, or aspects of the environment surrounding computing device 200. Environment characteristics may include humidity, ambient light, temperature, pressure or other physical property, or a combination thereof. The context of the computing device may be determined in view of one or more characteristics using contextual data module 212 and may be stored in data store 250A as contextual data 252.

Contextual data 252 may be any data that indicates a context of computing device 200 and may be stored in data store 250A. Contextual data 252 may represent the context of computing device 200 before, during, or after a request is initiated to access a protected resource. Computing device 200 may determine contextual data 252 by requesting, querying, calculating, executing, or reading data from a device or sensor associated with computing device 200.

Contextual data 252 may be derived from measurement data of a property detected by one or more sensors of the computing device 200. The one or more sensors may be used to measure the properties of the computing device or the surrounding environment and may include measurement of temperature, humidity, location, lighting, other property or a combination thereof. Measurement data comprises one or more data items corresponding to a single reading of measurement data from a particular type of contextual data 256 detected by the one or more sensors of the computing device 200. In one example, a first data item may correspond to measurement data associated with location data (e.g. coordinates of a geographic point), whereas a second data item may correspond to measurement data associated with humidity data (e.g. percentage of humidity in the environment).

Contextual data 252 may correspond to one or more spatial or temporal dimensions and may include temporal data 253A, location data 253B, proximity data 253C, humidity data 253D, accelerometer data, ambient light data, temperature data, pressure data, altimeter data, speed data, direction data, weight data, other data, or a combination thereof. Several examples of the possible types of contextual data will be discussed in details below.

Temporal data 253A may indicate one or more times that are before, during, or after a request to access the protected resource is initiated. The times may be, current times (e.g., system times), past times (e.g., historical times), future times (e.g., extrapolated times), or a combination thereof. The times may include one or more time values that represent points in time (e.g., time stamp), time durations, other time measurement, or a combination thereof. The time values may include numeric data, alpha numeric data, character data, binary data, other data, or a combination thereof. Each of the one or more time values may correspond to a relative time, an absolute time, or a combination thereof. A relative time may be based on when the computing devices was manufactured, activated, turned on, restarted, logged on, connection established, or other reference time. An absolute time value may be an approximate duration of time (e.g., number of seconds) that has elapsed since a particular reference time (e.g., Jan. 1, 1970). The reference time may be a relative time that is specific to computing device 200 or may be a universal time (e.g., global time) that is used by a plurality of devices. For example, the universal time may be based on the Universal Reference Time (e.g., Coordinated Universal time (UTC)), Intentional Organization for Standardization (ISO) time (e.g., ISO 8601), other reference time, or a combination thereof. In one example, temporal data may include a time value that may be the same or similar to Unix Epoch time, Portable Operating System Interface (POSIX) time, or system time (e.g., OS or processor time).

Contextual data module 212 may determine temporal data 253A in view of a time of computing device 200. The time may be a system time that comprises a single number (e.g., signed integer) that may or may not be updated (e.g., incremented or replaced) every one or more seconds by computing device 200. Contextual data module 212 may determine the temporal data by accessing, retrieving, or requesting, the current time of computing device 200 (e.g., executing GetSystemTime function).

Location data 253B may include data that indicates a physical or virtual location of one or more of the requesting device (e.g., 130A, FIG. 1), the providing device (e.g., 130B-C, FIG. 1), a communication device (e.g., beacon, access point, communication tower), other device, or a combination thereof. Location data 253B may indicate a current location, a past location (e.g., historical locations), a future location (e.g., extrapolated location), or a combination thereof. Location data 253B may include an absolute location relative to the earth and may be referred to as a geographic location. The absolute location may include geographic coordinates that represent a set of one or more geographic points or geographic regions. The geographic coordinates may include one or more numbers that uniquely identify a position of a point, area, volume, or other portion of space. In one example, location data 253B may include a coordinate with two values that identify a point in two-dimensional space, such as a latitude and longitude pair. In another example, location data 253B may include more or less values and may identify a point in three-dimensional space, such as a latitude and longitude pair coupled with a height value (e.g., altitude, elevation, depth, geopotential height).

Contextual data module 212 may determine location data 253B in view of satellites, cellular towers, network addresses, other device information, or a combination thereof. Location data 253B may correspond to a location within a reference system (e.g., coordinate system, geo-fence) that is the same or similar to a spherical system (e.g., geographic coordinate system), Euclidean system, or other reference system. In one example, location data 253B may be determined using a Global Positioning System (GPS).

Proximity data 253C may indicate whether computing device 200 is near one or more objects (e.g., devices or users). Proximity data 253C may be similar to location data 253B and both may indicate a physical location of computing device 200. As such, both the proximity data 253C and location data 253B may be generally referred to as spatial data. In contrast, proximity data 253C may differ from location data 253B because proximity data 253C may indicate a physical location that is relative to another device (e.g., a relative location) without knowing an absolute location (e.g., geographical location). In one example, proximity data 253C may indicate a distance value (e.g., linear distance) between computing device 200 and one or more objects. In another example, proximity data 253C may indicate whether computing device 200 is within a linear distance threshold with or without providing a particular distance value. In either example, proximity data 253C may be determined using a proximity sensor associated with computing device 200.

The proximity sensor may enable computing device 200 to detect whether it is in the presence of a nearby object without requiring physical contact with the object. The proximity sensor may include one or more communication modules (e.g., Bluetooth® transceiver) that can be used to detect signals from one or more devices or other pieces of hardware that transmit the signals. The signal may be a wireless signal, a wired signal, or a combination thereof. The signal source may include beacons (e.g., bluetooth beacons), network nodes (e.g., access points, switches, routers), other devices, or a combination thereof.

Contextual data module 212 may analyze signals to determine a physical location of itself relative to a signal source. The determination may be based on latency, signal strength, signal frequency, propagation delay, other attribute, or a combination thereof. Contextual data module 212 may analyze signals from a single source or from multiple sources. The analysis may involve determining a physical attribute of one or more signals. The signal may function as a beacon and may be based on one or more electromagnetic signals. The electromagnetic signals may include radio frequency (RF) signals, infrared signals, optical signals, other signals, or a combination thereof. The beacon may also or alternatively be based on electrical signals (e.g., wired connection), sonic signals (e.g., ultrasonic signals), other signals, or a combination thereof. Computing device 200 may be capable of transmitting the signals, receiving the signals, or a combination thereof. In one example, the computing device 200 may include radio frequency transceivers that receive and transmit the signals using a WiFi® protocol, a Bluetooth® protocol, other standard or proprietary protocol, or a combination thereof.

In one example, contextual data module 212 may determine the physical location based on latency by identifying a roundtrip time for a signal (e.g., message). For example, contextual data module 212 may determine a time duration between when a signal is transmitted (e.g., message sent) to when a response is received (e.g., same or different message received). The time duration may or may not be adjusted based on a processing delay of the device to respond to the transmitted signal. The resulting time duration may represent the bidirectional latency and may be divided by two to identify a unidirectional latency. Either the bidirectional or unidirectional latency may be converted to a distance value based on frequency of the signal (e.g., 2.4 GHz) and/or speed of the signal (e.g., speed of a 2.4 GHz signal through air).

Humidity data 253D may include data that indicates the humidity level of the environment surrounding one or more of the requesting device (e.g., 130A, FIG. 1), the providing device (e.g., 130B-C, FIG. 1), other device, or a combination thereof. Humidity data 253D may include the amount of water vapor in the atmosphere, in soil, or in confined spaces. In one example, humidity data may indicate whether the humidity in the environment surrounding computing device 200 is below or above a preconfigured threshold of humidity value. For example, the computing device 200 may be a lock box that may be accessible when the humidity value around the lock box is below the preconfigured threshold. Contextual data module 212 may determine humidity data in view of hygrometer. Hygrometer may rely on measurements of some other property such as temperature, pressure, mass, or a mechanical or electrical change in a substance as moisture is absorbed. These measured properties may lead to a measurement of humidity after applying calculation and calibration methods to the measured data.

Accelerometer data may include data that indicates the acceleration of a vehicle carrying one or more of the requesting device (e.g., 130A, FIG. 1), the providing device (e.g., 130B-C, FIG. 1), other device, or a combination thereof. Acceleration is the rate of change of the velocity of an object. For example, acceleration data may be used to determine vehicle acceleration, vibration on cars, machines, buildings, and safety installations. Acceleration data may also be used to determine seismic activity, machine vibration, inclination, and speed with or without the influence of gravity. In one example, accelerometer data may indicate whether computing device 200 is located inside a moving vehicle or located in a standstill location. Contextual data module 212 may determine acceleration data in view of accelerometers.

Ambient light data may include data that indicates the ambient light level in the environment surrounding one or more of the requesting device (e.g., 130A, FIG. 1), the providing device (e.g., 130B-C, FIG. 1), other device, or a combination thereof. Because ambient light sensors can be partly or fully obscured by shadows or objects that cover the sensor, multiple sensors placed some distance apart may be used to provide ambient light data. In one example, ambient light data may indicate whether the intensity of light in the environment surrounding computing device 200 is below or above a preconfigured threshold of light intensity value. For example, a protected resource associated with computing device 200 may be accessible when the computing device 200 is outdoors during daylight. Contextual data module 212 may determine ambient light data in view of an ambient light sensor. An ambient light sensor may be a phototransistor, a photodiode, or a photonic integrated circuit. A phototransistor is a light-sensitive bipolar transistor encased in a transparent case so that light can reach a base-collector junction. A photodiode is a semiconductor device that converts light into an electrical current. A photonic integrated circuit integrates a photodetector and an amplifier in one device.

Conversion data module 214 may enable computing device 200 to access conversion data to transform contextual data 252. Conversion data 214 may be associated with a particular device or protected resource and may be used as parameters to transform contextual data 212 into cryptographic values. Conversion data 214 may be stored in data store 250B (e.g., data storage device) that is communicably coupled to computing device 200 and may be internal or external to computing device 200. In the example shown in FIG. 2, data store 250B may be an internal data store that is integrated within computing device 200. In another example (not shown), data store 250B may be an external data store that is external to an enclosure of computing device and may include flash drives (e.g., USB key), external hard drive, network storage (e.g., Network Attached Storage (NAS), Storage Area Network (SAN), cloud storage), chip card (e.g., smart card), key fob, other data storage, or a combination thereof.

Data store 250B may be a security enhanced portion of another data storage device (e.g., 250A). Data store 250B may include secondary storage (e.g., hard drive, solid state drive), memory (e.g., volatile or non-volatile memory), registers (e.g., processor registers), other data storage, or a combination thereof. In one example, data store 250B may be internal data storage that includes a private region of storage that may be referred to as an enclave and may be protected using Software Guard Extensions (SGX) for Intel® processors. The private region may be a portion of data store 250A (e.g., main memory) and the processor (e.g., CPU) may protect the private region from being accessed by processes running at reduced privilege levels (e.g., application level, as opposed to kernel level).

Conversion data 257 may be used for transforming contextual data 252 and may originate from a trusted source that is associated with computing device 200. The trusted source may cause data store 250B to be modified to include conversion data 257 and this may occur before, during, or after the computing device 200 is provided to a user. In one example, the trusted source may be a device associated with an IT department of a business entity and may modify data store 250B to include the conversion data during an installation, configuration, deployment, update (e.g., reconfiguration), other provisioning phase, or a combination thereof. The modification may involve direct physical access to computing device 200 or may be modified without direct physical access (e.g., pushed or pulled over a network connection).

Conversion data 257 may be based on access criteria that indicate the circumstances in which computing device 200 should or should not have access to the protected resource. The access criteria may include a set of criteria that include or correspond to conditional statements indicating when a protected resource can be accessed. Each access criteria in the set may indicate a value or range of values that when satisfied enable or disable access. The values may correspond to one or more time ranges (e.g., time blocks or durations), location ranges (e.g., geographic areas), proximity ranges (e.g., distances), other range, or a combination thereof. For example, the access criteria may indicate the protected resource can be accessed during particular times (e.g., business hours or not on weekends), at particular locations (e.g., data center, home office, not at school), or within a particular proximity (e.g., within 20 feet of the device, not when others users or computing devices are around). In another example, the access criteria may indicate the protected resource can be accessed when the device is in a standstill condition (e.g., not within a moving vehicle), at a particular humidity level (e.g., a lock box of a musical instrument may not open if room is too dry), or at a particular lighting level (e.g., device is outdoors in daylight). Conversion data 257 may include one or more values of the access criteria or be derived from the access criteria. In one example, the conversion data 257 may include one or more values for a transformation function module 216 and may or may not be reverse engineered to determine the values of the access criteria.

The access criteria may be available to the trusted source without being available to the access requesting device (e.g., 200) or the access providing device (e.g., 130B-D). Some access control systems may include the access criteria on the access requesting or access providing device so that executable code running on the respective device can evaluate the access criteria when providing access. The presence of the access criteria on one of these devices may adversely affect the security of the system. The security of the system may be more vulnerable because the executable code can be circumvented or the access criteria can be accessed, modified, or reverse engineered to determine or alter where and when the device can be accessed. By having the access requesting and the access providing devices be absent (e.g., without, free of, or missing) the access criteria it may reduce the possibility that the access criteria are compromised, which may enhance the security of the access control mechanism.

Conversion data 257 may be selected by the trusted source to transform a set of alternate contextual data values (e.g., different times or locations) into a specific cryptographic value. The specific cryptographic value is the value that when provided as input to the cryptographic key function results in the creation of the correct key. If the cryptographic value is different the resulting cryptographic key will be incorrect. The set of alternate contextual data values may include values that comply with the access criteria, values that do not comply with an access criteria, or a combination thereof. The trusted source may generate conversion data 257 that when used as input to the transformation function causes the alternate contextual data values that comply with the access criteria to be transformed into the specific cryptographic value (e.g., correct value) and the alternate contextual values that do not comply with the access criteria to be transformed to a cryptographic value (e.g., incorrect value) that is different from the specific cryptographic value. In one example, there may only be a single correct cryptographic value (or small sub set of values) that qualify as the specific cryptographic value and there may be a plurality of incorrect cryptographic values.

Transformation function module 216 may enable computing device 200 to perform a transformation 260 of contextual data 252 to generate cryptographic value 254. Transformation 260 may involve executing one or more transformation functions that take contextual data 252 as input and provide cryptographic value 254 as output. The transformation function may involve one or more operations (e.g., commands, instructions) that modify one or more parameters, variables, constants, coefficients, other expression, or a combination thereof. The operations may modify, add, remove, switch, replace, trim, concatenate, pad, or alter, one or more bits of contextual data 252. The transformation function may also or alternatively involve one or more mathematical functions and may include equations, formulas, theorems, expressions, statements, other mathematical representations, or a combination thereof.

Cryptographic value 254 may be output of the transformation function and may include one or more bits. Cryptographic value 254 may be stored in data store 250A which may include non-persistent storage, persistent storage, or a combination thereof. In one example, transforming the contextual data 252 may involve transforming temporal data into a specific cryptographic value (e.g., correct value) for temporal data corresponding to a time within a time range and transforming the temporal data into one of a plurality of other values (e.g., incorrect values) in response to the temporal data corresponding to a time outside the time range. In either example, the resulting cryptographic value 254 may be used as input to a cryptographic key creation component 220.

Cryptographic key creation component 220 may enable computing device 200 to create a cryptographic key that can be used for accessing the protected resource. Cryptographic key creation component 220 may use the transformed contextual data discussed above to create cryptographic key 256. Cryptographic key 256 may be the same or similar to one or more cryptographic keys 150A-B of FIG. 1. In one example, cryptographic key creation component 220 may include a cryptographic input module 222 and a key creation module 224.

Cryptographic input module 222 may include features for retrieving input for a cryptographic function. The input may be retrieved from data store 250A (e.g., general data storage), data store 250B (e.g., enclave), other location, or a combination thereof. The input may be referred to as cryptographic input and may include security data 258, contextual data 252, cryptographic value 257, other data, or a combination thereof. Security data 258 may include a security key that is in a human readable form (e.g., security passcode or password), a non-human readable form (e.g., cryptographic key, digital token or certificate), other form, or a combination thereof. The security key may be a symmetric key or asymmetric key and may be public or kept secret. The security key may function as a base key and be used to derive one or more other keys (e.g., cryptographic key 256). In one example, the security data 258 may be stored with conversion data 257 in data store 250B and may be retrieved before, during, or after the conversion data 257 is retrieved. In another example, security data 258 may be received from another device as part of an update or key exchange (e.g., Diffie-Hellman key exchange). In either example, the security data 258 may be used as input to create the key.

Some or all of the cryptographic input may be provided to the function as separate parameters, combined parameters, or a combination thereof. For example, when multiple types of contextual data (e.g., temporal and spatial) are used to derive a cryptographic key, cryptographic input module 222 may combine the cryptographic value of a first contextual data (e.g., temporal data) and the cryptographic value of the second contextual data (e.g., spatial data) to produce a combined cryptographic value that can be used as input for key creation module 224.

Key creation module 224 may access data of cryptographic input module 222 and use it to perform key creation 270. Key creation 270 may involve executing a cryptographic key function that may or may not incorporate a number generator (e.g., random or pseudo-random number generator). Key creation 270 may supplement the cryptographic input discussed above with seed data, salt data, other data, or a combination thereof. The cryptographic key function may be the same or similar to a key generator function (e.g., keygen), a key derivation function (KDF), a cryptographic hash function, other cryptographic function, or a combination thereof. The key generator function may create the cryptographic key based on the transformed contextual data (e.g., cryptographic value 254) but may not use the secret key (e.g., absent a base key). The key derivation function may be similar to a key generator function but may create a cryptographic key using a base key (e.g., secret key).

The key derivation function may derive the cryptographic key from the secret key using the transformed contextual data (e.g., cryptographic value 254). This may result in a cryptographic key that is related to the secret key (e.g., mathematically related keys). The key derivation function may involve key stretching (e.g., key lengthening), key strengthening (e.g., key hardening), other key modification, or a combination thereof. The key derivation function may or may not enhance the security of the key or adjust the length of the key to comply with a particular format (e.g., minimum key length).

In one example, cryptographic key function may be a Password-Based Key Derivation Function (e.g., PBKDF1, PBKEDF2). The password-based key derivation function may repeatedly apply a Hash-based Message Authentication Code (HMAC) one or more salt values to the cryptographic input (e.g., transformed contextual data) to produce a cryptographic key. In another example, the cryptographic key function may include a cryptographic hash function, other function, or a combination thereof. In any of the above examples, the resulting cryptographic key may be stored in data store 250A as cryptographic key 256 and available to access enablement component 230.

Access enablement component 230 may enable computing device 200 to use cryptographic key 256 to access a protected resource. As discussed above in regards to computing devices 130B-D, there may be many different ways cryptographic key 256 may be used to access the protected resource. In one example, cryptographic key 256 may be used to establish a communication channel with another device. In another example, cryptographic key 256 may be used to encrypt or decrypt a data storage object (e.g., file). In other examples, cryptographic key 256 may be used as a key to a locking mechanism or some combination thereof to provide physical or virtual access to the protected resource. As shown in FIG. 2, access enablement component 230 may include an initiation module 232 and an access enablement module 234.

Initiation module 232 may enable computing device 200 to process a request to access the protected resource. The request may be manually or automatically initiated based on user input, the context of computer device 200, or a combination thereof. In one example, the request may be manually initiated in response to user input and the context data may be accessed, generated, or retrieved in response to the user input. The user input may involve any input provided by a user that can be detected and interpreted by computing device 200. Example user input may include touch input (e.g., tapping, touch gestures), accelerometer input (e.g., movement gestures), image input (e.g., face scan), audio input (e.g., voice commands), keyboard input (e.g., hitting enter), mouse input (e.g., clicking connect button), other input, or a combination thereof.

The request may be initiated based on a change in the context of computer device 200. The change in context may be detected by analyzing the contextual data and detecting when a change satisfies one or more triggering criteria (e.g., triggering conditions, triggering data). In one example, the contextual data used to initiate the request may be different from the contextual data used to create the cryptographic key. For example, a first type of contextual data (e.g., location data) may be used to initiate the request but a second type of contextual data (e.g., temporal data) may be used to create the cryptographic key. In other examples, the contextual data used to initiate the request and create the key may be the same or overlap (e.g., both use spatial data but key creation also uses temporal data). The triggering criteria may be the same or similar to the access criteria discussed above and when satisfied may communicate with or initiate access enablement module 234.

Access enablement module 234 may enable computing device 200 to use cryptographic key 256 to enable access to the protected resource. Enabling access may involve providing cryptographic key 256 as input to a cryptographic function. The cryptographic function may be the same or similar to the cryptographic function discussed above and may include one or more authentication functions, encryption/decryption functions, authorization functions, verification functions, integrity functions, non-repudiation functions, hash functions, other functions, or a combination thereof.

The cryptographic function may be executed on computing device 200, on one or more other computing devices, or a combination thereof. In one example, access enablement module 234 may transmit cryptographic key 256 to another computing device and the other computing device may execute a cryptographic function using cryptographic key 256. In another example, computing device 200 may execute the cryptographic function locally using the cryptographic key 256. In either example, access enablement module 234 may perform or cause one or more operations to provide, establish, facilitate, allow, permit, arrange, or enable access or make the protected resource available to computing device 200 or to a user of computing device 200. The operations may involve establishing a communication channel, decrypting content, unlocking an access control mechanism, or a combination thereof.

Establishing a communication channel may involve using cryptographic key 256 to communicate with another computing device. Establishing the communication channel may involve using the cryptographic key 256 to authenticate the computing device by authenticating or authorizing a user, process, device, interface, address, port, socket, other computing structure, or a combination thereof. Establishing the communication channel may also or alternatively involve using the cryptographic key to verify message content received over the communication channel (e.g., session key). Access enablement module 234 may also enable access by using the cryptographic key to decrypt content. The content may be message content received using the communication channel or may be a local or remote data storage object (e.g., file).

Access enablement module 234 may unlock an access control mechanism by providing or transmitting cryptographic key 256 to access control mechanism on computing device 200 or another computing device (e.g., embedded control system). The recipient device may execute a cryptographic function using the cryptographic key and grant access if the cryptographic key is correct. Granting access may involve unlocking the access control mechanism to provide access to the protected resource.

Figure 3:
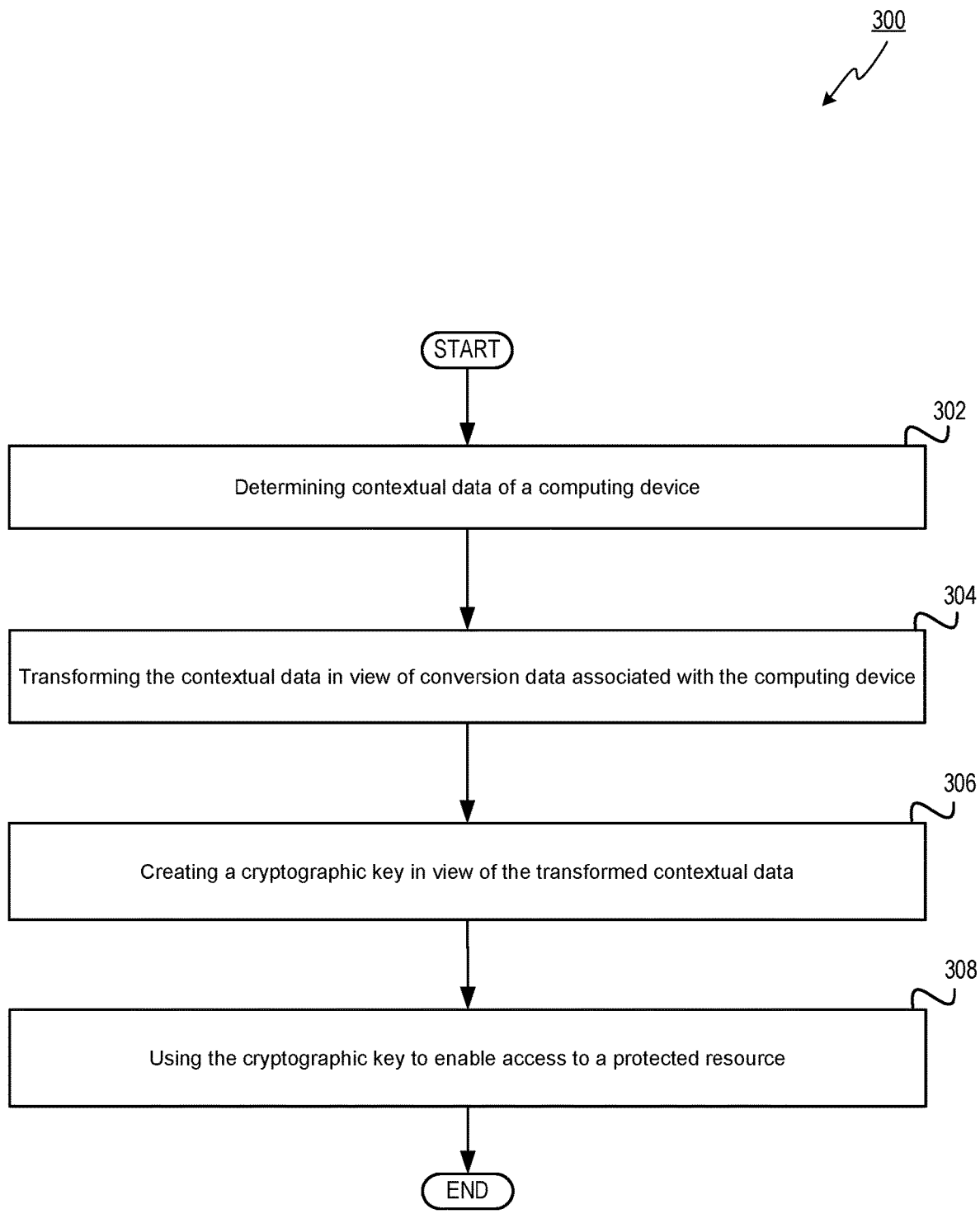
FIG. 3 depicts a flow diagram of an example method for enabling access to a protected resource using a cryptographic key created based on contextual data, in accordance with one or more aspects of the present disclosure.

FIG. 3 depicts a flow diagram of one illustrative example of a method 300 for enabling access to a protected resource using cryptographic key created based on contextual data, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 210, 220, and/or 230 of FIG. 2.

Method 300 may be performed by processing devices of a client device or server device of a distributed storage system and may begin at block 302. At block 302, a processing device may determine contextual data of a computing device. The determination of the contextual data may involve querying, acquiring, capturing, collecting, or requesting contextual data from a module of a computing device. In one example, the contextual data may correspond to measurement data of a property detected by one or more sensors of the computing device. Determining the contextual data may involve retrieving the current measurement data from the one or more sensors of the computing device.

At block 304, the processing device may transform the contextual data in view of conversion data associated with the computing device. The conversion data may be stored in an enclave of the computing device and may include one or more values (e.g., numeric or binary values). The values may be provided as input to a transformation function and may cause a set of alternate contextual data values to transform to a specific cryptographic value. The set of alternate contextual data values may include a range of values in which the protected resource is accessible or is not accessible by the computing device. The range of values may include one or more ranges of measurement data (e.g. range of relative or absolute distances). In one example, transforming the contextual data may involve transforming the alternate contextual data into the specific cryptographic value (e.g., correct value) for contextual data corresponding to a data item within a measurement data range and transforming the contextual data into one of a plurality of other values (e.g., incorrect values) in response to the contextual data corresponding to a data item outside the measurement data range.

Transforming the contextual data of the computing device may involve determining the conversion data that is associated with the computing device and performing a mathematic transformation using the one or more values to produce the specific cryptographic value. The cryptographic value may include a plurality of bits and may be stored in a persistent or non-persistent data store. In one example, the mathematic transformation may include one or more mathematical equations and the conversion data may include input for the mathematical equation (e.g., values for constants, coefficients, variables, parameters).

At block 306, the processing device may create a cryptographic key in view of the transformed contextual data (e.g., cryptographic value). The cryptographic key may be used as a decryption key, an authentication key, an authorization key, a signature key, a transport key, an integrity key, a verification key, other use, or a combination thereof. Creating the cryptographic key may involve accessing security data associated with the computing device and executing a key derivation function using the security data, the transformed contextual data, or a combination thereof. In one example, the security data may include a security key and the security key and conversion data may be stored together in an enclave of the computing device.

At block 308, the processing device may use the cryptographic key to enable access to a protected resource. As discussed above, there may be many different ways to enable access to the protected resource. In one example, the cryptographic key may include a session key and the processing device may use the session key to establish a communication channel (e.g., SSL or IPSec connection) for accessing the protected resource. In another example, the cryptographic key may be a symmetric key for decrypting and/or encrypting data of the protected resource. The data may include encrypted message data, encrypted file data, encrypted database data, other data, or a combination thereof. The symmetric key used by the processing device may be created after the protected resource is encrypted and may be identical to the symmetric key used to encrypt the protected resource. For example, the symmetric key of the first computing device may be identical to a symmetric key of second device and may be obtained without performing a key exchange between the first computing device and the second computing device.

Figure 4:
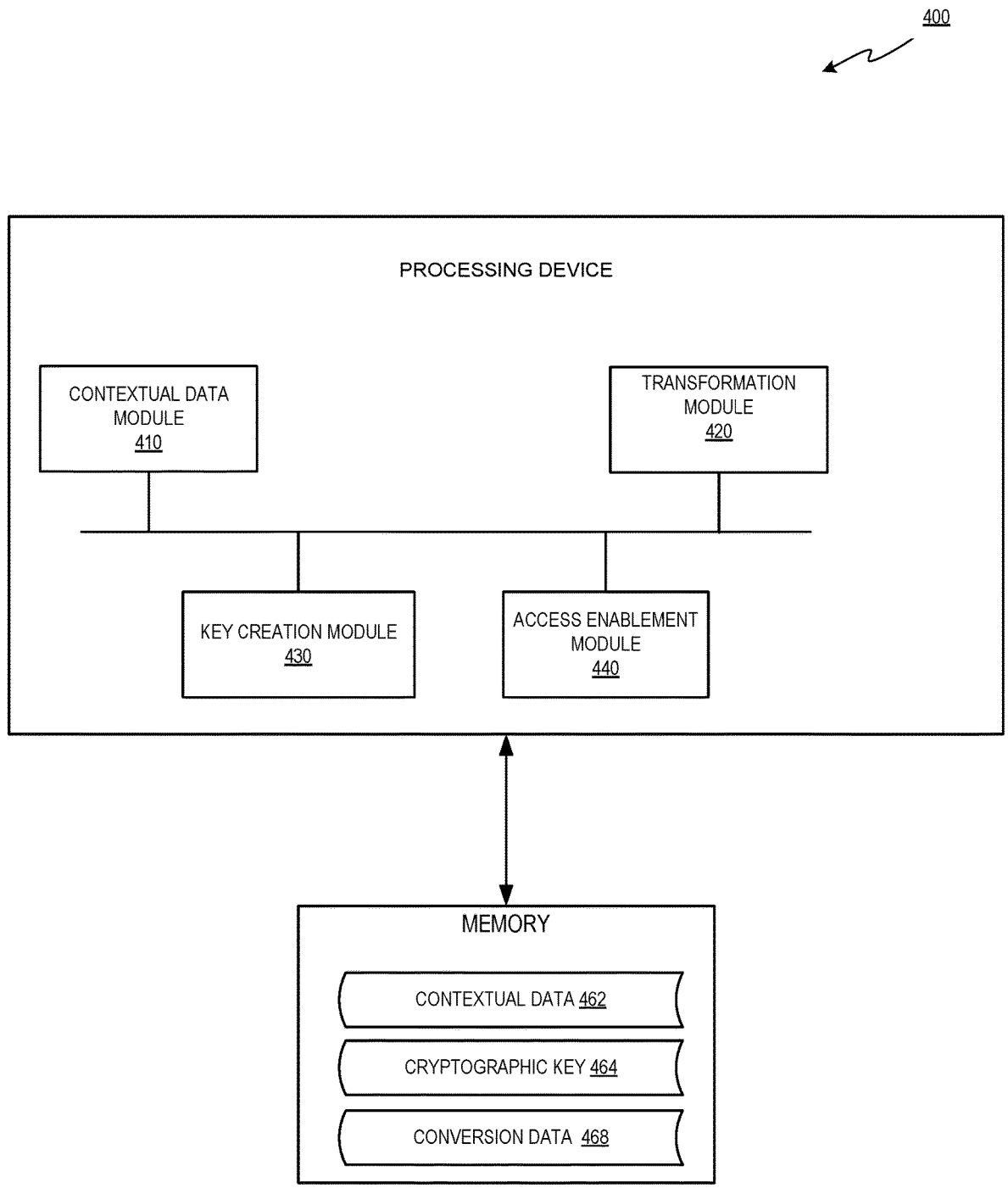
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer device 600 or 700 and may include one or more processing devices and one or more memory devices. In the example shown, computer system 400 may include a distributed contextual data module 410, a transformation module 420, a key creation module 430, and an access enablement module 440.

Contextual data module 410 may enable processing device to determine contextual data of a computing device. The determination of the contextual data 462 may involve querying, requesting, acquiring, capturing, collecting, or requesting contextual data from a module of a computing device. In one example, the contextual data may correspond to measurement data of a property detected by one or more sensors of the computing device. Determining the contextual data may involve retrieving the current measurement data from the one or more sensors of the computing device.

Transformation module 420 may enable processing device to transform the contextual data 462 in view of conversion data 468 associated with the computing device. The conversion data may be stored in an enclave of the computing device and may include one or more values (e.g., numeric or binary values). The values may be provided as input to a transformation function and may cause a set of alternate contextual data values to transform to a specific cryptographic value. The set of alternate contextual data values may include a range of values in which the protected resource is accessible or is not accessibly by the computing device. The range of values may include one or more ranges of measurement data (e.g. range of relative or absolute distances). In one example, transforming the contextual data may involve transforming the alternate contextual data into the specific cryptographic value (e.g., correct value) for contextual data corresponding to a data item within a measurement data range and transforming the contextual data into one of a plurality of other values (e.g., incorrect values) in response to the contextual data corresponding to a data item outside the measurement data range.

Transforming the contextual data 462 of the computing device may involve determining the conversion data 468 that is associated with the computing device and performing a mathematic transformation using the one or more values to produce the specific cryptographic value. The cryptographic value may include a plurality of bits and may be stored in a persistent or non-persistent data store. In one example, the mathematic transformation may include one or more mathematical equations and the conversion data may include input for the mathematical equation (e.g., values for constants, coefficients, variables, parameters).

Key creation module 430 may enable the processing device to create a cryptographic key 464 in view of the transformed contextual data (e.g., cryptographic value). The cryptographic key 464 may be used as a decryption key, an authentication key, an authorization key, a signature key, a transport key, an integrity key, a verification key, other use, or a combination thereof. Creating the cryptographic key may involve accessing security data associated with the computing device and executing a key derivation function using the security data, the transformed contextual data, or a combination thereof. In one example, the security data may include a security key and the security key and conversion data 468 may be stored together in an enclave of the computing device.

Access enablement module 440 may enable the processing device to access the protected resource using the cryptographic key 464. As discussed above, there may be many different ways to enable access to the protected resource. In one example, the cryptographic key 464 may include a session key and the processing device may use the session key to establish a communication channel (e.g., SSL or IPSec connection) for accessing the protected resource. In another example, the cryptographic key may be a symmetric key for decrypting and/or encrypting data of the protected resource. The data may include encrypted message data, encrypted file data, encrypted database data, other data, or a combination thereof. The symmetric key used by the processing device may be created after the protected resource is encrypted and may be identical to the symmetric key used to encrypt the protected resource. For example, the symmetric key of the first computing device may be identical to a symmetric key of second device and may be obtained without performing a key exchange between the first computing device and the second computing device.

Figure 5:
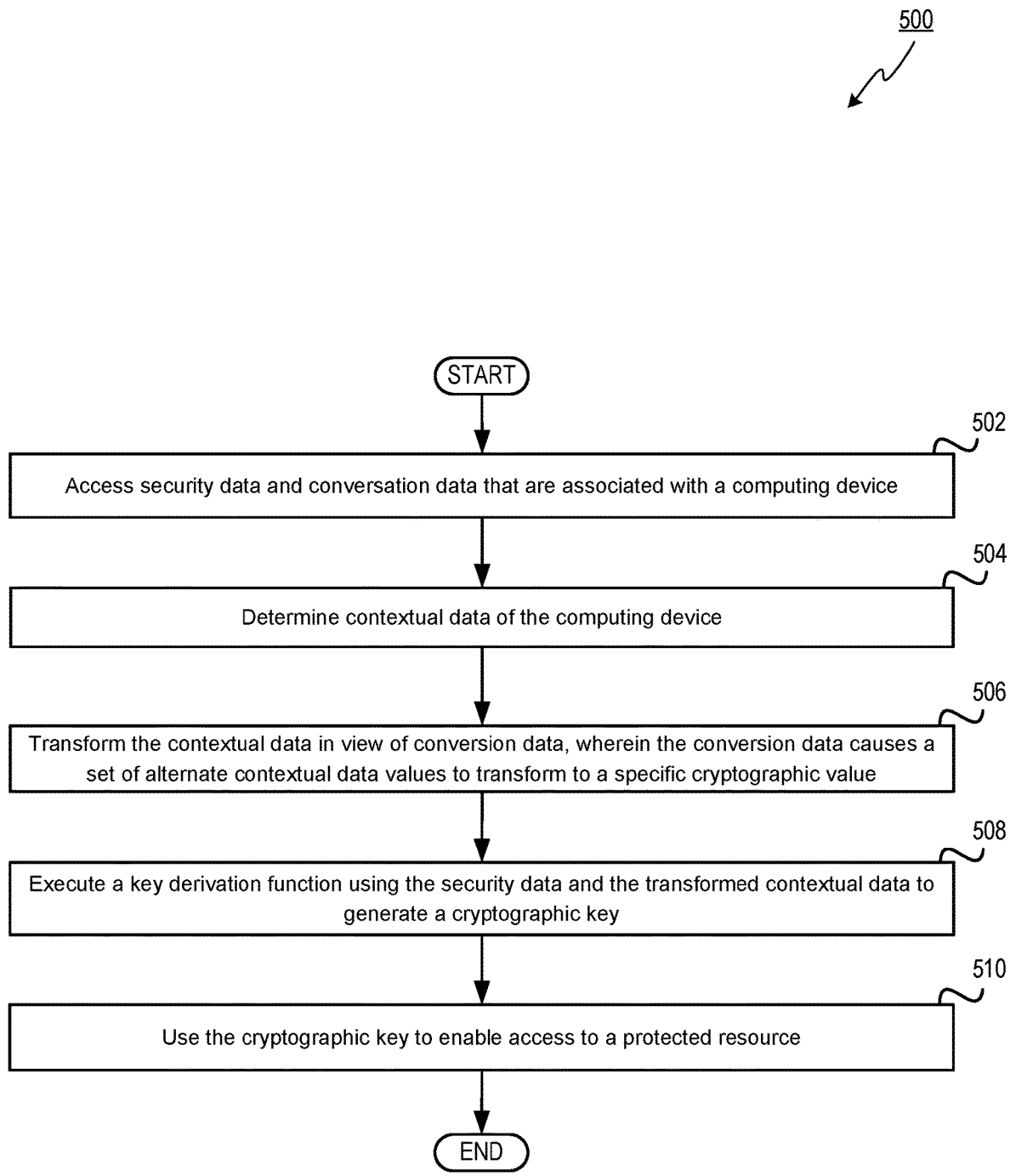
FIG. 5 depicts a flow diagram of another example method for enabling access to a protected resource using cryptographic key created based on contextual data, in accordance with one or more aspects of the present disclosure.

FIG. 5 depicts a flow diagram of one illustrative example of a method 500 for enabling access to a protected resource using cryptographic key created based on contextual data, in accordance with one or more aspects of the present disclosure. Method 500 may be similar to method 300 and each of its individual functions, routines, subroutines, or operations may be performed by one or more processors of the computer device executing the method. Method 500 may be performed by processing devices of a client device or server device of a constrained key derivation system and may begin at block 502.

At block 502, a processing device may access security data and conversation data that are associated with a computing device. The security data may include a security key and the security key and the conversion data are stored in an enclave of the computing device. The security key may be in a human readable form (e.g., security passcode or password), a non-human readable form (e.g., cryptographic key, digital token or certificate), other form, or a combination thereof. The security key may be a symmetric key or asymmetric key and may be public or kept secret. The security key may function as a base key and be used to derive one or more other keys. In one example, the security data may be stored with conversion data in a data store and may be retrieved before, during, or after the conversion data is retrieved.

At block 504, a processing device may determine contextual data of the computing device. In determining the contextual data, the processing device may retrieve measurement data of a property detected by one or more sensors of the computing device. In one example, the contextual data may correspond to measurement data of a property detected by one or more sensors of the computing device. Determining the contextual data may involve retrieving the current measurement data from the one or more sensors of the computing device.

At block 506, a processing device may transform the contextual data in view of conversion data, causing a set of alternate contextual data values to transform to a specific cryptographic value. The set of alternate contextual data values may correspond to a range of measurement data at which the protected resource becomes accessible. To transform the contextual data, the processing device is to transform the contextual data into the specific cryptographic value in response to the contextual data corresponding to a data item within the range of measurement data. The cryptographic value may include a plurality of bits and may be stored in a persistent or non-persistent data store. In one example, the mathematic transformation may include one or more mathematical equations and the conversion data may include input for the mathematical equation (e.g., values for constants, coefficients, variables, parameters).

At block 508, a processing device may execute a key derivation function using the security data and the transformed contextual data to generate a cryptographic key. In one example, the security data may include a security key and the security key and conversion data may be stored together in an enclave of the computing device. The enclave of the computing device may include a private region of storage that may be protected using Software Guard Extensions (SGX) for Intel® processors. The private region may be a portion of data store 250A (e.g., main memory) and the processor (e.g., CPU) may protect the private region from being accessed by processes running at reduced privilege levels (e.g., application level, as opposed to kernel level). The key derivation function may involve key stretching (e.g., key lengthening), key strengthening (e.g., key hardening), other key modification, or a combination thereof. The key derivation function may or may not enhance the security of the key or adjust the length of the key to comply with a particular format (e.g., minimum key length).

At block 510, the processing device may use the cryptographic key to enable access to a protected resource. As discussed above, there may be many different ways to enable access to the protected resource. In one example, the cryptographic key may include a session key and the processing device may use the session key to establish a communication channel (e.g., SSL or IPSec connection) for accessing the protected resource. In another example, the cryptographic key may be a symmetric key for decrypting and/or encrypting data of the protected resource. Responsive to completing the operations described herein above with references to block 510, the method may terminate.

Figure 6:
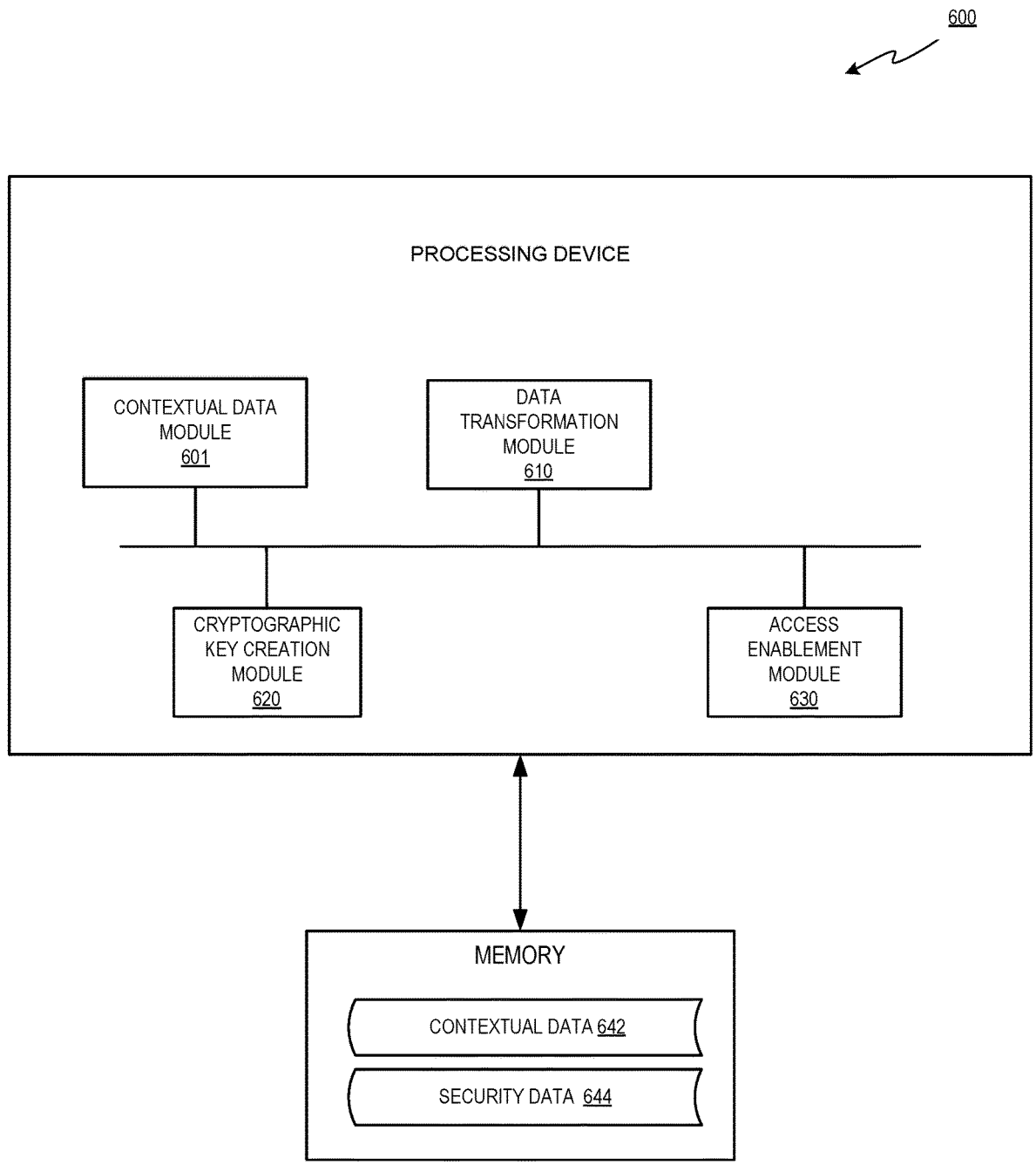
FIG. 6 depicts a block diagram of an apparatus in accordance with one or more aspects of the present disclosure.

FIG. 6 depicts a block diagram of an apparatus 600 operating in accordance with one or more aspects of the present disclosure. Apparatus 600 may include one or more processing devices and one or more memory devices. In the example shown, apparatus 600 may include a contextual data module 601, data transformation module 610, a cryptographic key creation module 620, and an access enablement module 630.

Contextual data module 601 may enable processing device to determine contextual data of a computing device. The determination of the contextual data 642 may involve querying, requesting, acquiring, capturing, collecting, or requesting contextual data from a module of a computing device. In one example, the contextual data may correspond to measurement data of a property detected by one or more sensors of the computing device. Determining the contextual data may involve retrieving the current measurement data from the one or more sensors of the computing device.

Data transformation module 610 may enable a processing device to transform contextual data of a computing device. The transformation of contextual data 642 is in view of conversion data associated with the computing device. The conversion data may be stored in an enclave of the computing device and may include one or more values (e.g., numeric or binary values). The values may be provided as input to a transformation function and may cause a set of alternate contextual data values to transform to a specific cryptographic value. Transforming the contextual data 642 of the computing device may involve determining the conversion data that is associated with the computing device and performing a mathematic transformation using the one or more values to produce the specific cryptographic value. The cryptographic value may include a plurality of bits and may be stored in a persistent or non-persistent data store.

Cryptographic key creation module 620 may enable the processing device to create a cryptographic key in view of the transformed contextual data (e.g., cryptographic value). The cryptographic key may be used as a decryption key, an authentication key, an authorization key, a signature key, a transport key, an integrity key, a verification key, other use, or a combination thereof. Creating the cryptographic key may involve accessing security data 644 associated with the computing device and executing a key derivation function using the security data 644, the transformed contextual data, or a combination thereof. In one example, the security data 644 may include a security key and the security key and conversion data may be stored together in an enclave of the computing device.

Access enablement module 630 may enable the processing device to access the protected resource using the cryptographic key created in view of security data 644. As discussed above, there may be many different ways to enable access to the protected resource. In one example, the cryptographic key may include a session key and the processing device may use the session key to establish a communication channel (e.g., SSL or IPSec connection) for accessing the protected resource. In another example, the cryptographic key may be a symmetric key for decrypting and/or encrypting data of the protected resource. The data may include encrypted message data, encrypted file data, encrypted database data, other data, or a combination thereof. The symmetric key used by the processing device may be created after the protected resource is encrypted and may be identical to the symmetric key used to encrypt the protected resource.

Figure 7:
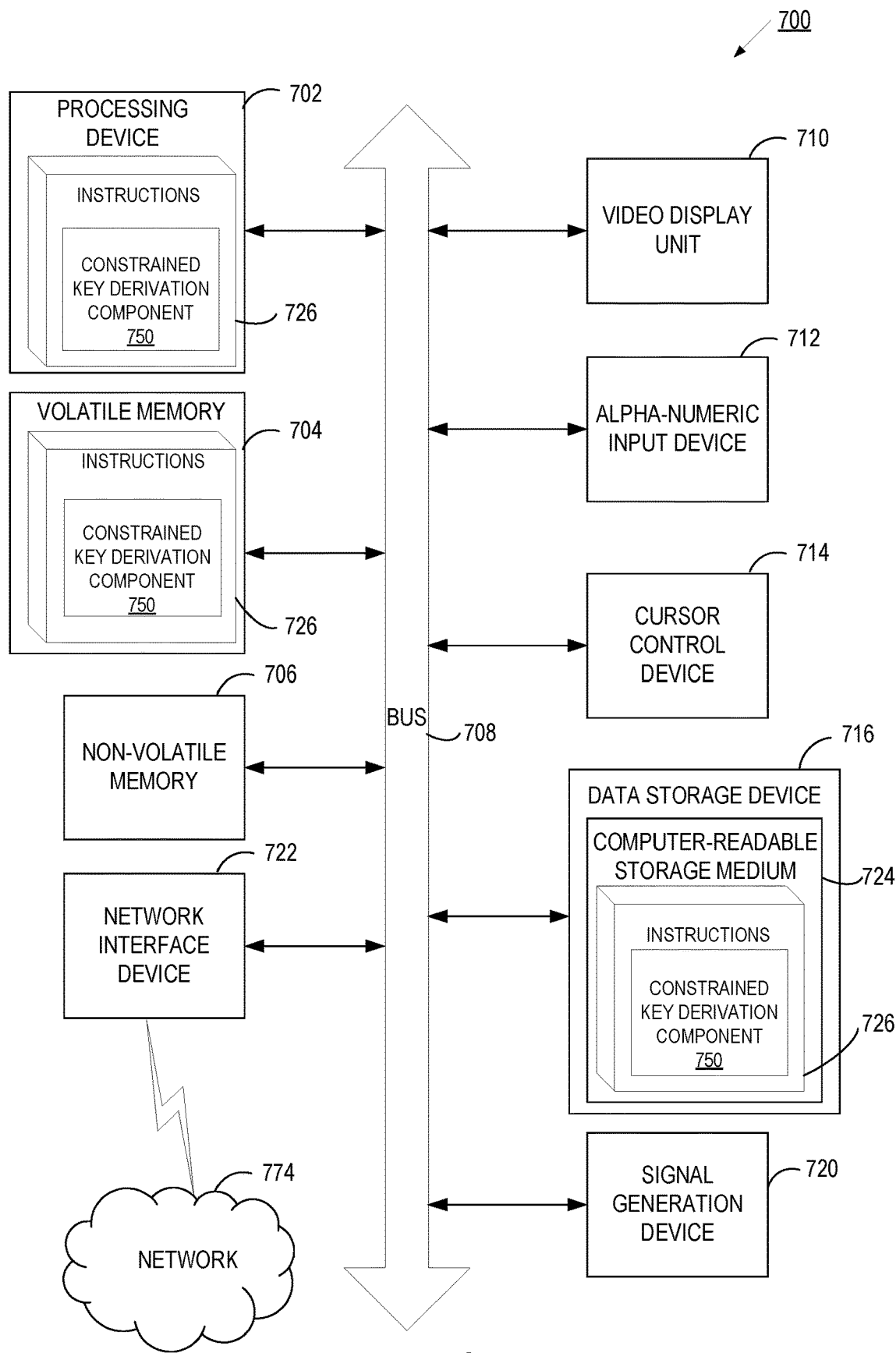
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing devices 130A-D of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding constrained key derivation component 750 of FIG. 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Other computer system designs and configurations may also be suitable to implement the system and methods described herein. The following examples illustrate various implementations in accordance with one or more aspects of the present disclosure.

Example 1 is a method comprising: determining contextual data of a computing device, transforming the contextual data in view of conversion data associated with the computing device, wherein the conversion data causes a set of alternate contextual data values to transform to a specific cryptographic value, creating, by a processing device, a cryptographic key in view of the transformed contextual data, and using the cryptographic key to enable access to a protected resource.

Example 2 is a method of example 1, wherein determining the contextual data comprises accessing measurement data of a property detected by one or more sensors of the computing device, wherein the measurement data comprises a measurement data value.

Example 3 is a method of example 1, wherein the set of alternate contextual data values corresponds to a range of measurement data values that the protected resource becomes accessible.

Example 4 is a method of example 3, wherein transforming the contextual data comprises transforming the contextual data into the specific cryptographic value in response to the contextual data being within the range.

Example 5 is a method of example 1, wherein the conversion data is selected to cause contextual data that is within a measurement range to be transformed into the specific cryptographic value and contextual data that is outside the measurement range to be transformed into another cryptographic value.

Example 6 is a method of example 1, wherein the cryptographic key comprises a session key and wherein using the cryptographic key to enable access comprises using the session key to establish a communication channel for accessing the protected resource.

Example 7 is a method of example 1, wherein the cryptographic key is created on a first computing device and is identical to a cryptographic key created on a second device, and wherein the creating the cryptographic key on the first computing device is performed without a key exchange between the first computing device and the second computing device.

Example 8 is a method of example 1, wherein the cryptographic key comprises a symmetric key and wherein using the cryptographic key to access the protected resource comprises using the symmetric key to decrypt data of the protected resource.

Example 9 is a method of example 8, wherein the symmetric key is created after the protected resource is encrypted, and wherein the symmetric key is identical to a symmetric key used to encrypt the protected resource.

Example 10 is a method of example 1, wherein creating the cryptographic key comprises accessing security data associated with the computing device, and executing a key derivation function using the security data and the transformed contextual data.

Example 11 is a method of example 10, wherein the security data comprises a security key and wherein the security key and the conversion data are stored in an enclave of the computing device.

Example 12 is a method of example 1, wherein transforming the contextual data of the computing device comprises determining the conversion data associated with the computing device, wherein the conversion data comprises one or more values, performing a mathematic transformation on the contextual data using the one or more values to produce the specific cryptographic value, and storing the cryptographic value in a data store, wherein the cryptographic value comprises a plurality of bits.

Example 13 a method of example 12, wherein the mathematic transformation comprises a mathematical equation and the conversion data comprises input for the mathematical equation.

Example 14 is a system comprising: a memory; and a processing device operatively coupled to the memory, the processing device to: determine contextual data of a computing device; transform the contextual data in view of conversion data associated with the computing device, wherein the conversion data causes a set of alternate contextual data values to transform to a specific cryptographic value; create a cryptographic key in view of the transformed contextual data; and use the cryptographic key to enable access to a protected resource.

Example 15 is a system of example 14, wherein to determine the contextual data the processing device is to access measurement data of a property detected by one or more sensors of the computing device, wherein the measurement data comprises a measurement data value.

Example 16 is a system of example 14, wherein the set of alternate contextual data values corresponds to a range of measurement data values that the protected resource becomes accessible.

Example 17 is a non-transitory machine-readable storage medium storing instructions that cause a processing device to: access security data and conversation data that are associated with a computing device; determine contextual data of the computing device; transform the contextual data in view of conversion data, wherein the conversion data causes a set of alternate contextual data values to transform to a specific cryptographic value; execute a key derivation function using the security data and the transformed contextual data to generate a cryptographic key; and use the cryptographic key to enable access to a protected resource.

Example 18 is a non-transitory machine-readable storage medium of example 17, wherein to determine the contextual data the processing device is to access measurement data of a property detected by one or more sensors of the computing device, wherein the measurement data comprises a measurement data value.

Example 19 is a non-transitory machine-readable storage medium of example 17, wherein the set of alternate contextual data values corresponds to a range of measurement data values that the protected resource becomes accessible.

Example 20 is a non-transitory machine-readable storage medium of example 19, wherein to transform the contextual data the processing device is to transform the contextual data into the specific cryptographic value in response to the contextual data being within the range.

Example 21 is a non-transitory machine-readable storage medium of example 17, wherein the security data comprises a security key and wherein the security key and the conversion data are stored in an enclave of the computing device.

Example 22 is a method comprising: accessing security data and conversation data that are associated with a computing device; determining contextual data of a computing device; transforming the contextual data in view of conversion data, wherein the conversion data causes a set of alternate contextual data values to transform to a specific cryptographic value; executing a key derivation function using the security data and the transformed contextual data to generate a cryptographic key; and using the cryptographic key to disable access to a protected resource.

Example 23 is a method of example 21, wherein the set of alternate contextual data values corresponds to a range of measurement data values that the protected resource becomes inaccessible.

Example 24 is a method of example 21, wherein determining the contextual data further comprises accessing measurement data of a property detected by one or more sensors of the computing device, wherein the measurement data comprises a measurement data value.

Example 25 is a method of example 21, wherein transforming the contextual data of the computing device comprises storing the cryptographic value in a data store accessible by the key derivation function, wherein the cryptographic value comprises a plurality of bits.

Example 26 is a method of example 21, wherein transforming the contextual data further comprises performing a mathematic transformation on the contextual data using a mathematical equation and the conversion data comprising an input for the mathematical equation.

Example 27 is an apparatus comprising: a means to determine contextual data of a computing device; a means to transform the contextual data in view of conversion data associated with the computing device, wherein the conversion data causes a set of alternate contextual data values to transform to a specific cryptographic value; a means to create, by a processing device, a cryptographic key in view of the transformed contextual data; and a means to use the cryptographic key to enable access to a protected resource.

Example 28 is an apparatus of example 27, wherein the means to transform the contextual data comprises a means to transform the contextual data into the specific cryptographic value in response to the contextual data being within the range.

Example 29 is an apparatus of example 27, wherein the means to transform the contextual data of the computing device comprises: a means to determine the conversion data associated with the computing device, wherein the conversion data comprises one or more values; a means to perform a mathematic transformation on the contextual data using the one or more values to produce the specific cryptographic value; and a means to store the cryptographic value in a data store, wherein the cryptographic value comprises a plurality of bits.

Example 30 is an apparatus of example 27, wherein the means to create the cryptographic key comprises: a means to access security data associated with the computing device; and a means to execute a key derivation function using the security data and the transformed contextual data.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "providing," "obtaining," "determining," "initiating," "accessing," "detecting," "generating," "creating," "establishing," "transmitting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   accessing, by a processing device, conversion data associated with a protected resource, wherein the conversion data is generated in view of access criteria indicating a plurality of ranges of measurement data values, and wherein each range of measurement data values of the plurality of ranges of measurement data values corresponds to a respective measured property of a plurality of measured properties;
   retrieving, by the processing device from a computing device attempting to access the protected resource, a plurality of current measurement data values, each current measurement data value of the plurality of current measurement data values corresponding to a respective measured property of the plurality of measured properties;
   determining, by the processing device, contextual data of the computing device in view of the plurality of current measurement data values;
   transforming, by the processing device in view of the conversion data, a set of alternate contextual data values for the contextual data into a specific cryptographic value, wherein the set of alternate contextual data values corresponds to the plurality of ranges of measurement data values;
   creating, by the processing device, a cryptographic key in view of the specific cryptographic value; and
   using, by the processing device, the cryptographic key to enable access to the protected resource.

2. The method of claim 1, wherein retrieving the plurality of current measurement data values comprises accessing the plurality of current measurement data values detected by one or more sensors of the computing device.

3. The method of claim 1 wherein transforming the contextual data comprises transforming the contextual data into the specific cryptographic value in response to the contextual data being within the plurality of ranges.

4. The method of claim 1, wherein the conversion data is selected to cause contextual data that is within a measurement range to be transformed into the specific cryptographic value and contextual data that is outside the measurement range to be transformed into another cryptographic value.

5. The method of claim 1, wherein the cryptographic key comprises a session key and wherein using the cryptographic key to enable access comprises using the session key to establish a communication channel for accessing the protected resource.

6. The method of claim 1, wherein the cryptographic key is created on a first computing device and is identical to a cryptographic key created on a second device, and wherein the creating the cryptographic key on the first computing device is performed without a key exchange between the first computing device and the second computing device.

7. The method of claim 1, wherein the cryptographic key comprises a symmetric key and wherein using the cryptographic key to access the protected resource comprises using the symmetric key to decrypt data of the protected resource.

8. The method of claim 7, wherein the symmetric key is created after the protected resource is encrypted, and wherein the symmetric key is identical to a symmetric key used to encrypt the protected resource.

9. The method of claim 1, wherein creating the cryptographic key comprises:
accessing security data associated with the computing device; and
executing a key derivation function using the security data and the transformed contextual data.

10. The method of claim 9, wherein the security data comprises a security key and wherein the security key and the conversion data are stored in an enclave of the computing device.

11. The method of claim 1, wherein transforming the contextual data of the computing device comprises:
determining the conversion data associated with the protected resource, wherein the conversion data comprises one or more values;
performing a mathematic transformation on the contextual data using the one or more values to produce the specific cryptographic value; and
storing the cryptographic value in a data store, wherein the cryptographic value comprises a plurality of bits.

12. The method of claim 11, wherein the mathematic transformation comprises a mathematical equation and the conversion data comprises input for the mathematical equation.

13. A system comprising:
a memory; and
a processing device operatively coupled to the memory, the processing device to:
access conversion data associated with a protected resource, wherein the conversion data is generated in view of access criteria indicating a plurality of ranges of measurement data values, and wherein each range of measurement data values of the plurality of ranges of measurement data values corresponds to a respective measured property of a plurality of measured properties;
retrieve, from a computing device attempting to access the protected resource, a plurality of current measurement data values, each current measurement data value of the plurality of current measurement data values corresponding to a respective measured property of the plurality of measured properties;
determine contextual data of the computing device in view of the plurality of current measurement data values;
transform, in view of the conversion data, a set of alternate contextual data values for the contextual data into a specific cryptographic value, wherein the set of alternate contextual data values corresponds to the plurality of ranges of measurement data values;
create a cryptographic key in view of the specific cryptographic value; and
use the cryptographic key to enable access to the protected resource.

14. The system of claim 13, wherein, to retrieve the plurality of current measurement data values, the processing device is to access the plurality of current measurement data values detected by one or more sensors of the computing device.

15. A non-transitory machine-readable storage medium storing instructions that cause a processing device to:
access security data and conversation data that are associated with a computing device, wherein the conversion data is generated in view of access criteria indicating a plurality of ranges of measurement data values, and wherein each range of measurement data values of the plurality of ranges of measurement data values corresponds to a respective measured property of a plurality of measured properties;
retrieve, from a computing device attempting to access the protected resource, a plurality of current measurement data values, each current measurement data value of the plurality of current measurement data values corresponding to a respective measured property of the plurality of measured properties;
determine contextual data of the computing device in view of the plurality of current measurement data values;
transform, in view of the conversion data, a set of alternate contextual data values for the contextual data into a specific cryptographic value, wherein the set of alternate contextual data values corresponds to the plurality of ranges of measurement data values;
execute a key derivation function using the security data and the specific cryptographic value to generate a cryptographic key; and
use the cryptographic key to enable access to the protected resource.

16. The non-transitory machine-readable storage medium of claim 15, wherein, to retrieve the plurality of current measurement data values, the processing device is to access the plurality of current measurement data values detected by one or more sensors of the computing device.

17. The non-transitory machine-readable storage medium of claim 15, wherein the processing device is to transform the contextual data into the specific cryptographic value in response to the contextual data being within the range.

* * * * *